(12) United States Patent
Lanini et al.

(10) Patent No.: US 11,718,221 B2
(45) Date of Patent: *Aug. 8, 2023

(54) LED LIGHT HOOD SCOOP FOR A JEEP WRANGLER

(71) Applicant: Westin Automotive Products, Inc., San Dimas, CA (US)

(72) Inventors: Jeremy Lanini, Alta Loma, CA (US); Robert L. West, Seal Beach, CA (US)

(73) Assignee: Westin Automotive Products, Inc., San Dimas, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 17/560,807

(22) Filed: Dec. 23, 2021

(65) Prior Publication Data

US 2022/0111788 A1    Apr. 14, 2022

Related U.S. Application Data

(62) Division of application No. 16/656,978, filed on Oct. 18, 2019, now Pat. No. 11,260,790.

(Continued)

(51) Int. Cl.
*B60Q 1/26* (2006.01)
*B62D 25/12* (2006.01)
(Continued)

(52) U.S. Cl.
CPC ......... *B60Q 1/2696* (2013.01); *B60Q 1/0017* (2013.01); *B60Q 1/0094* (2013.01);
(Continued)

(58) Field of Classification Search
CPC .. B60Q 1/2696; B60Q 1/0017; B60Q 1/0094; F21S 45/10; F21S 41/19; F21S 41/151; B62D 25/12
See application file for complete search history.

(56) References Cited

U.S. PATENT DOCUMENTS

| D428,284 S | 7/2000 | Kim |
| D914,934 S | 3/2021 | Yao |

(Continued)

FOREIGN PATENT DOCUMENTS

WO    9117067 A1    11/1991

*Primary Examiner* — Bryon T Gyllstrom
(74) *Attorney, Agent, or Firm* — The Dobrusin Law Firm, PC

(57) ABSTRACT

The present invention provides a method of installing a hood scoop to a designated recessed area of a hood of a Jeep® Wrangler Rubicon vehicle comprising: providing the hood scoop having a protective member and a hood attachment member having a first cable access feature wherein: edge profile of the hood attachment member matches edge profile of the designated recessed area; the designated recessed area includes a hood aperture that provides access to the vehicle's electrical power and control systems; attaching the attachment member to the designated recessed area using conventional attachment means; and attaching a light fixture to the hood scoop wherein the light fixture's cables pass through the first cable access feature and the hood aperture for communication with the vehicle's electrical power and control systems. The present invention also provides the hood scoop described herein.

20 Claims, 8 Drawing Sheets

Related U.S. Application Data

(60) Provisional application No. 62/750,970, filed on Oct. 26, 2018.

(51) Int. Cl.
*B60Q 1/00* (2006.01)
*F21S 41/151* (2018.01)
*F21S 41/19* (2018.01)
*F21S 45/10* (2018.01)
*F21Y 103/10* (2016.01)
*F21Y 115/10* (2016.01)
*F21W 104/00* (2018.01)
*F21W 107/10* (2018.01)

(52) U.S. Cl.
CPC ............ *B62D 25/12* (2013.01); *F21S 41/151* (2018.01); *F21S 41/19* (2018.01); *F21S 45/10* (2018.01); *F21W 2104/00* (2018.01); *F21W 2107/10* (2018.01); *F21Y 2103/10* (2016.08); *F21Y 2115/10* (2016.08)

(56) References Cited

U.S. PATENT DOCUMENTS

| | | | |
|---|---|---|---|
| 2015/0138819 A1* | 5/2015 | Salter | F21S 41/176 |
| | | | 362/510 |
| 2019/0070999 A1* | 3/2019 | Shipman | G09F 21/04 |
| 2019/0202346 A1* | 7/2019 | Shipman | G02B 5/208 |
| 2020/0130621 A1* | 4/2020 | Gauci | B62D 25/12 |

* cited by examiner

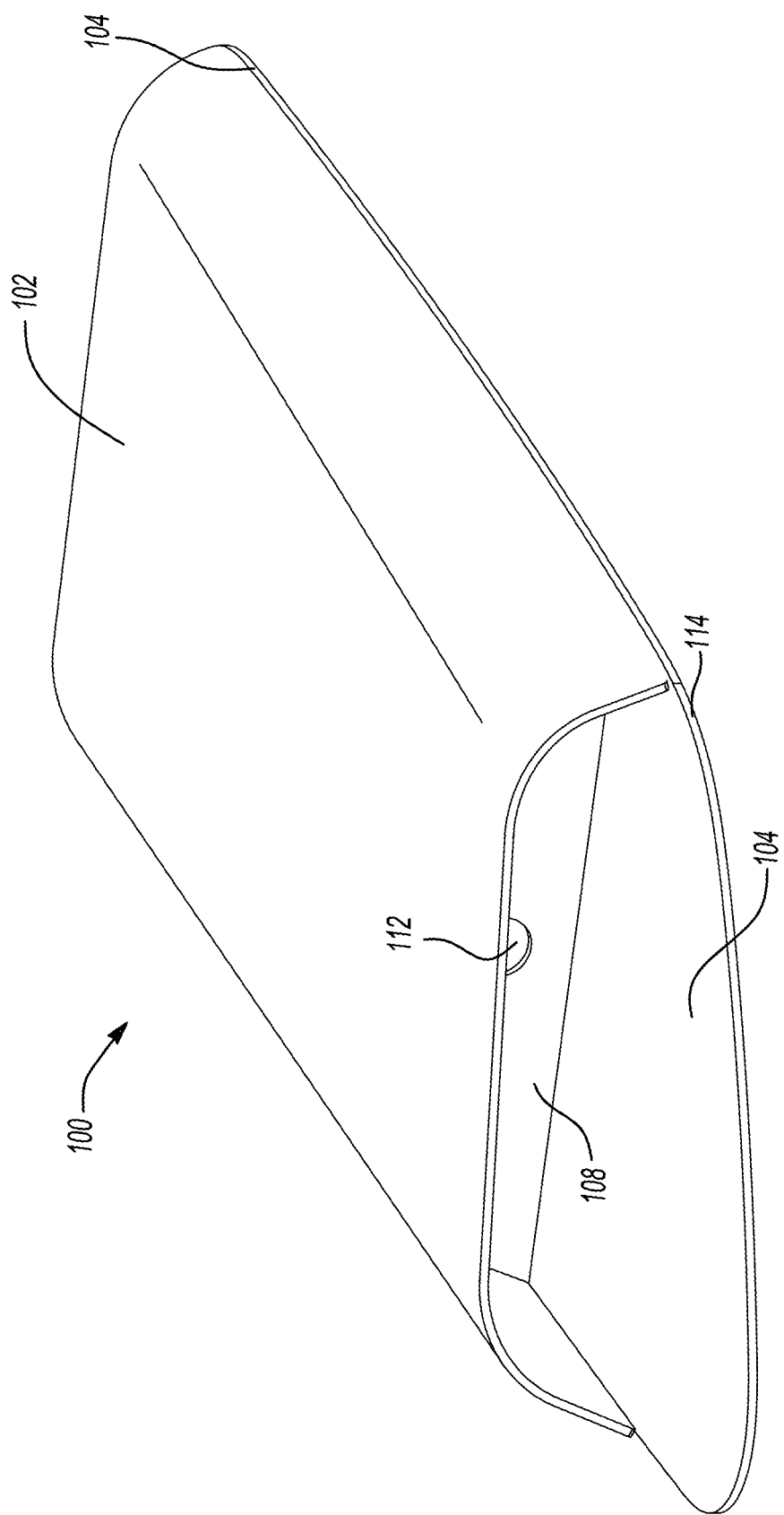

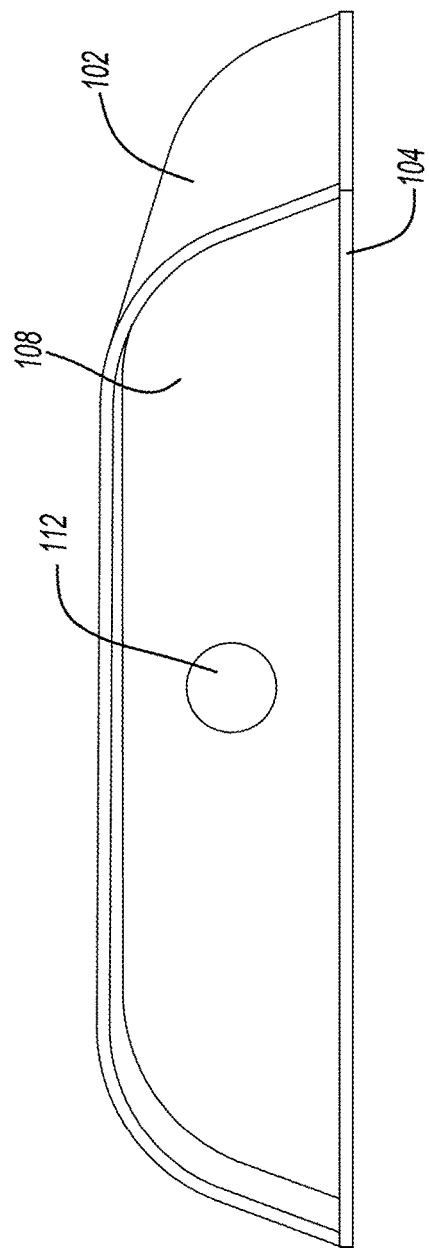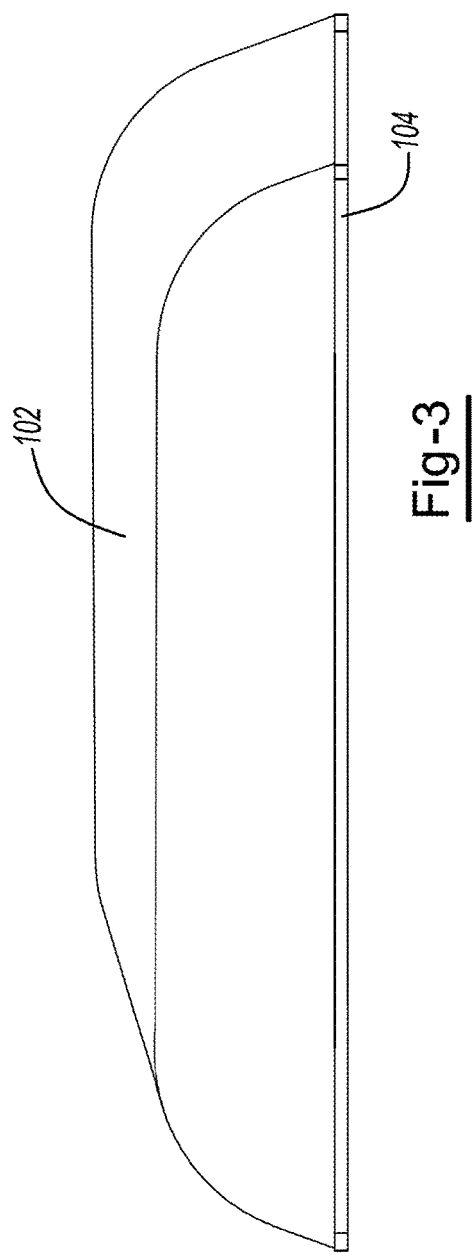

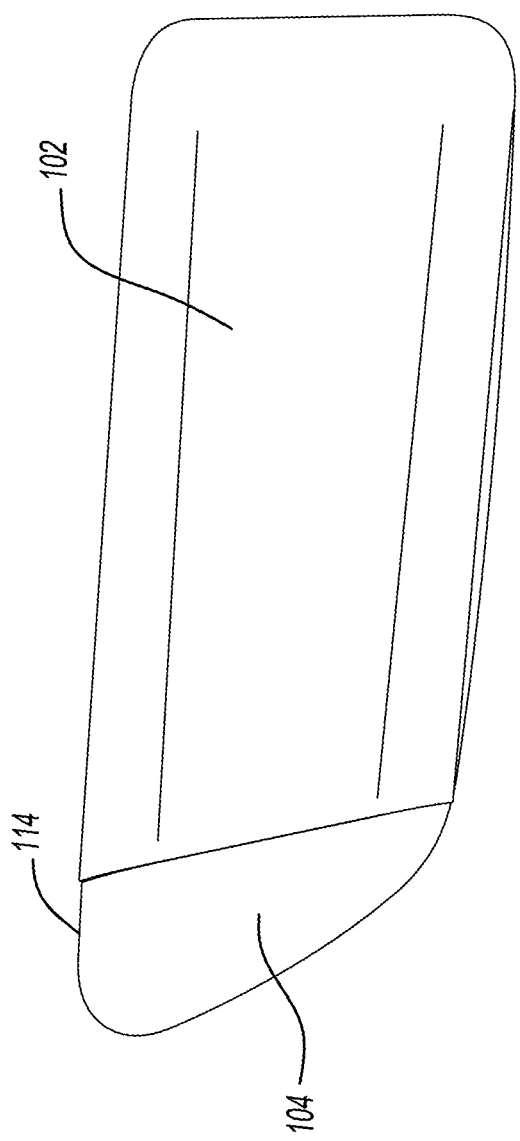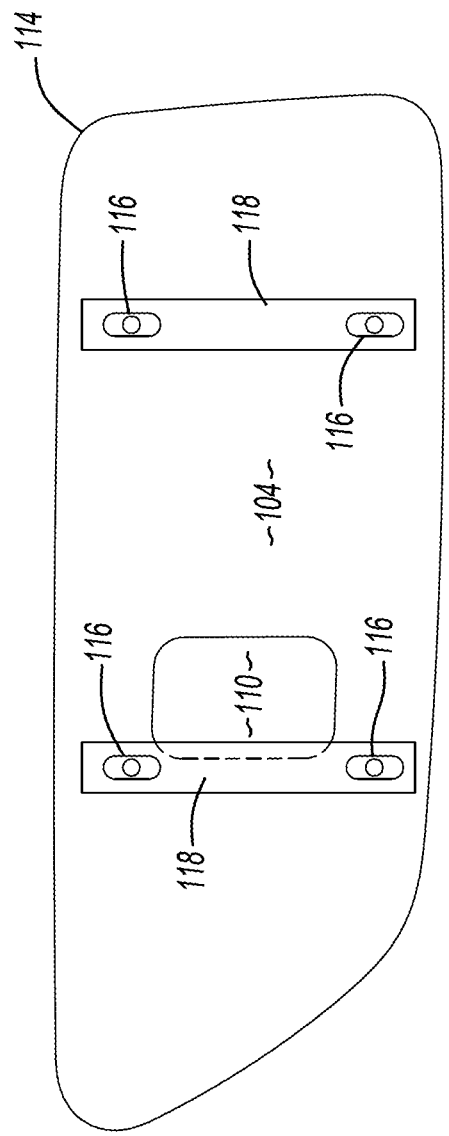

LED LIGHT HOOD SCOOP FOR A JEEP WRANGLER

FIELD OF INVENTION

The present invention relates to vehicle accessory field. More specifically, it relates to a hood scoop designed specifically to fit onto a Jeep® Wrangler Rubicon's hood wherein the hood scoop is used to house a light fixture such as a light emitting device ("LED") light bar.

BRIEF DESCRIPTION OF THE DRAWING

The present invention will be more clearly understood when considering the accompanying drawing of which:

FIG. 1 shows a front prospective view of a hood scoop in accordance with the principals of the present invention;

FIG. 2 shows a front view of the hood scoop shown in FIG. 1;

FIG. 3 shows a rear view of the hood scoop shown in FIG. 1;

FIG. 4 shows a top view of the hood scoop shown in FIG. 1;

FIG. 5 shows a bottom view of the hood scoop shown in FIG. 1;

DESCRIPTION OF THE PREFERRED EMBODIMENT

Figure 6:
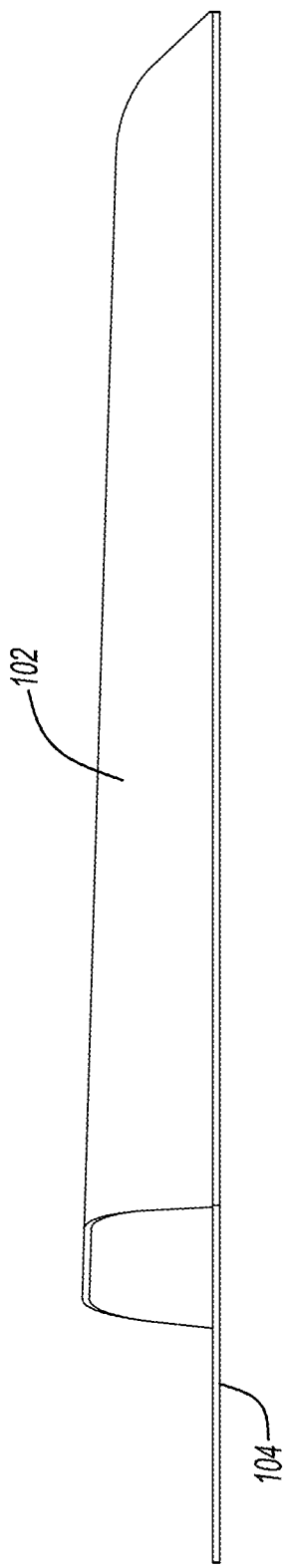
FIG. 6 shows a side view of the hood scoop shown in FIG. 1.

Referring to FIGS. 1-6, the present invention provides a hood scoop 100 having a protective member 102 and a hood attachment member 104 wherein the two members 102, 104 form a housing to contain and to protect one or more light fixture(s) 106. The light fixture(s) 106 can be any conventional light but is preferred to be one or more LED lights or light bars. Referring to FIG. 5, the hood attachment member 104 includes a first cable access feature 108 (e.g., an aperture) that allows passage of the light fixture(s)' 106 wirings and/or cables to pass through the first cable access feature 110.

Referring to FIGS. 1-2, the hood scoop 100 may optionally further include a light attachment member 108 having a second cable access feature 112 (e.g., an aperture) that provides an additional or alternative attachment surface for the light fixture(s) 106 and allowing the light fixture(s)' 106 wirings and/or cables to go through the second cable access feature 112 (usually prior to the cables going through the first cable access feature 110).

The light fixture(s) 106 can be attached to any or all of the members 102, 104, 108 via conventional attachment means (not shown) such as adhesive, Velcro, attachment clips, nuts and bolts, etc. It should be noted that each of these members (102, 104, 108) could be constructed of a single piece of material (e.g., a piece of metal or molded plastic) or a combination of multiple pieces of material(s).

Figure 7:
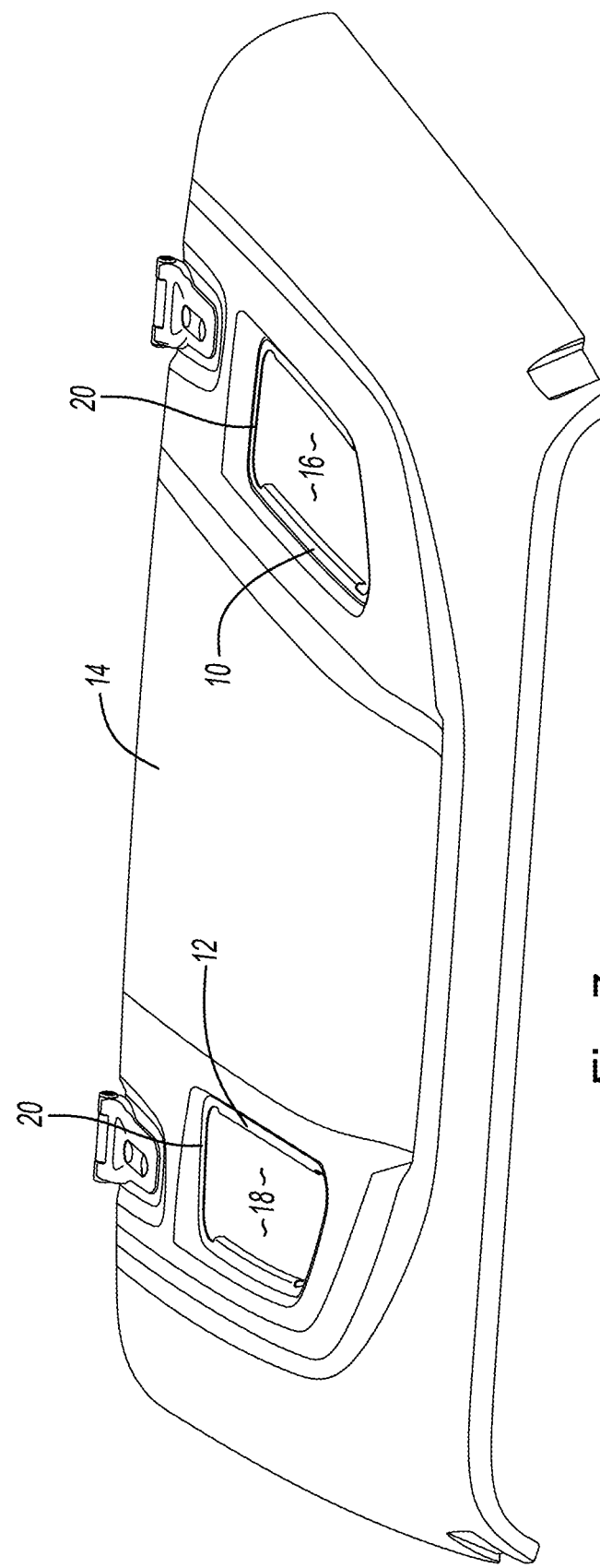
FIG. 7 shows a front prospective view of a Jeep® Wrangler Rubicon's front hood.
Figure 8:
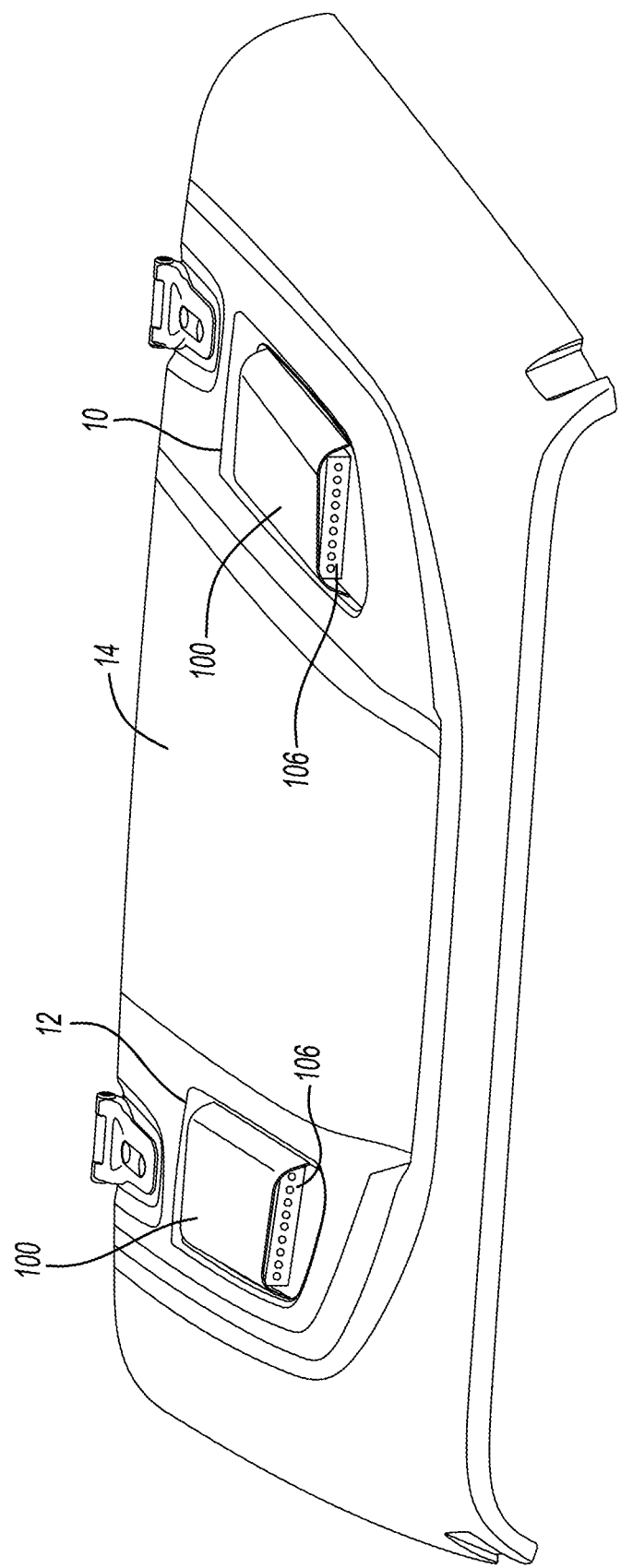
FIG. 8 shows the hood scoop shown in FIG. 1 and another hood scoop that is a mirror image of the hood scoop shown in FIG. 1 with each of the hood scoops housing one or more LED light fixture(s) and installed within a designated recessed area of the hood shown in FIG. 7.
Figure 9:
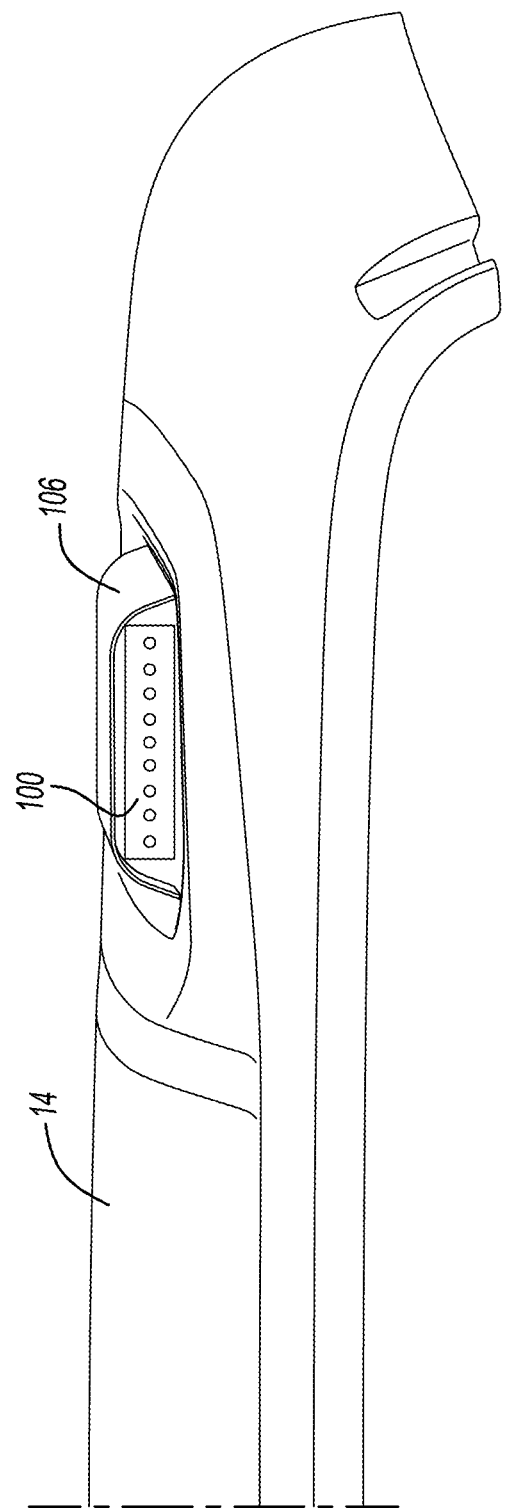
FIG. 9 shows a front view of a portion of the hood shown in FIG. 8 installed with the hood scoop shown in FIG. 1.
Figure 10:
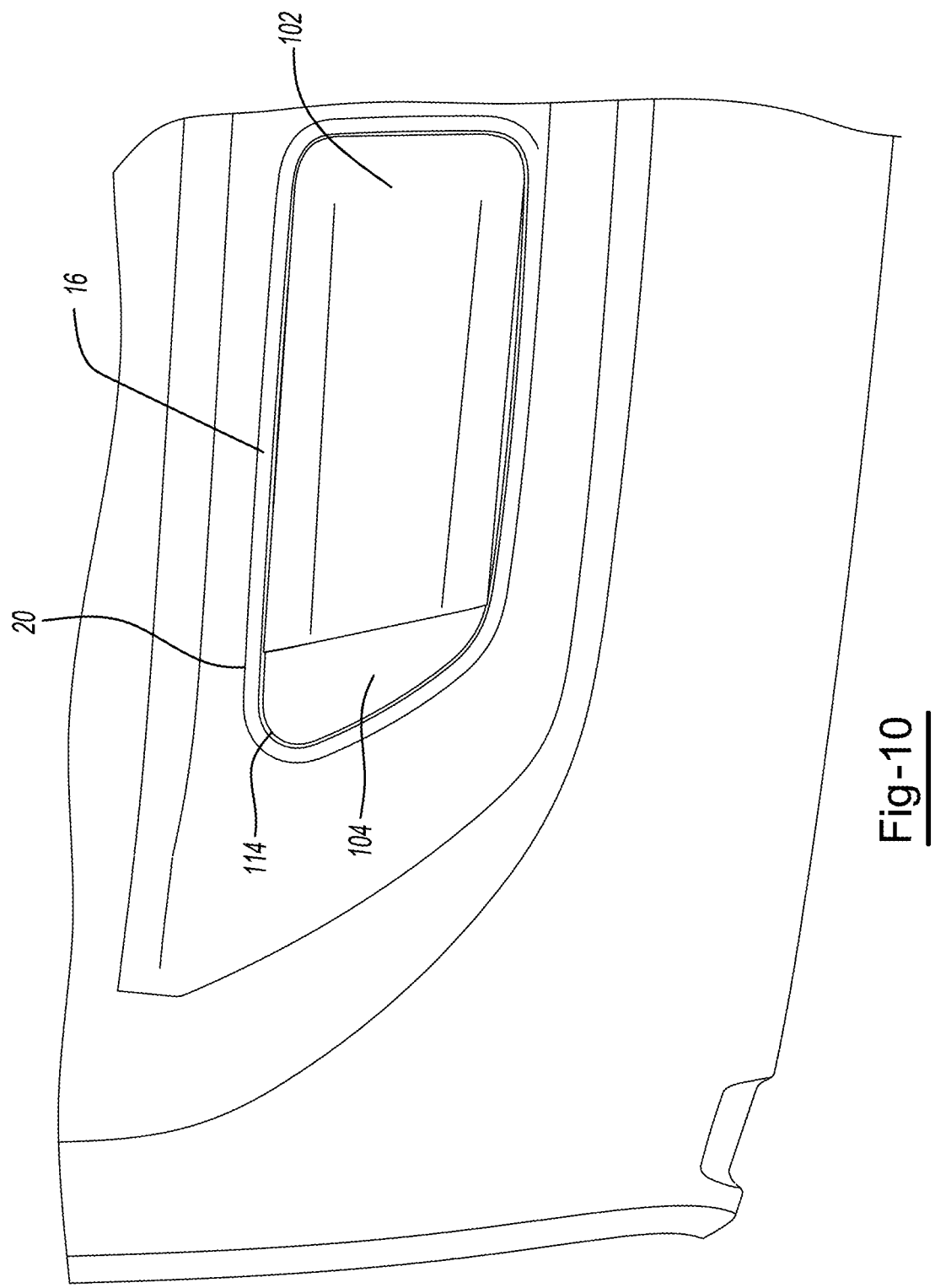
FIG. 10 shows a top view of the hood portion shown in FIG. 9.
Figure 11:
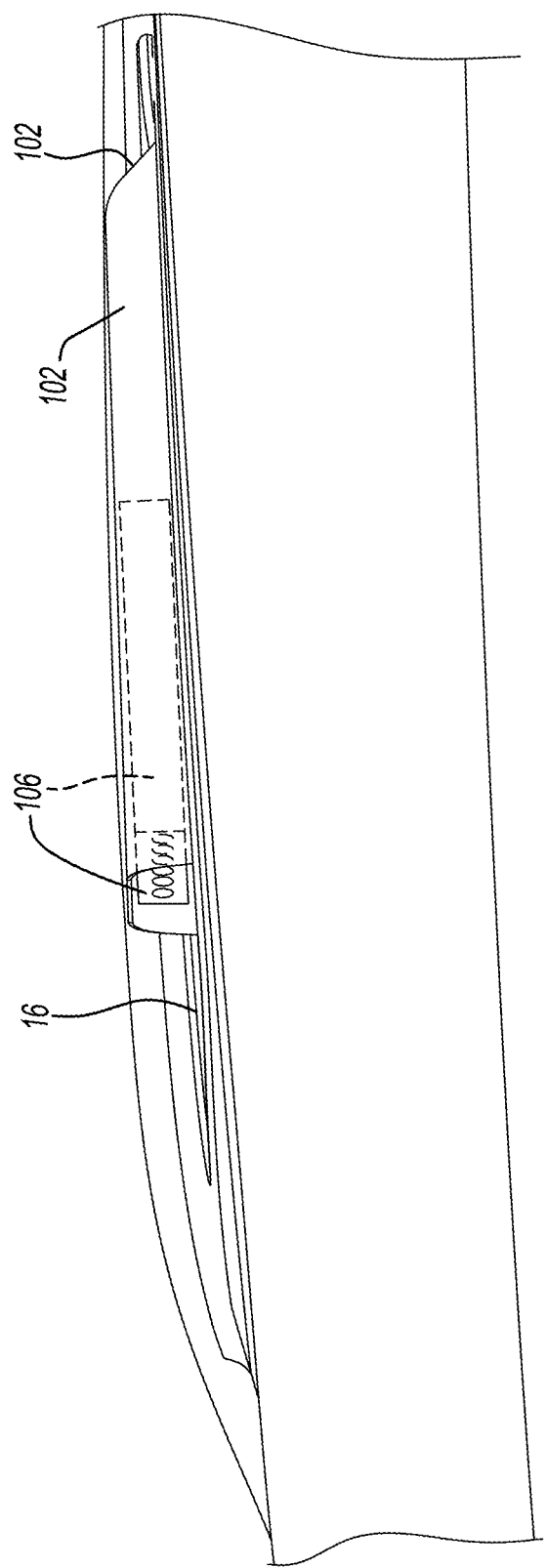
FIG. 11 shows a side view of the hood portion shown in FIG. 9.

Referring to FIGS. 7-8, the hood scoop 100 is specifically designed to fit onto a designated recessed area (10, 12) of a hood 14 of a Jeep® Wrangler Rubicon vehicle. See also https://www.jeep.com/wrangler.html. The hood 14 includes two of the designated recessed areas (10, 12). Each of the designated recessed areas (10, 12) has an edge profile that is a mirror image of each other as shown in FIG. 7. Furthermore, each of the designated recessed areas (10, 12) includes a hood aperture (16, 18) that provides access to the vehicle's electrical power and control systems. It is optionally that each of the hood apertures (16, 18) has an edge profile that is a mirror image of each other as shown in FIG. 7. "Edge profile" is defined herein as the outline (e.g., exterior shape) of the designated component. It is preferred that the edge profile 114 of the hood attachment member 104 matches the edge profile 20 of one of the designated recessed areas (10 or 12).

Furthermore, the hood attachment member 104 may optionally include conventional bolt-on clamps 118 having drill holes for bolts or screws 116 as shown in FIG. 6 that can be used to attach the hood attachment member 104 and the hood scoop 100 to the hood 10. Alternatively, the hood attachment member 104 can be attached to the hood 10 without the bolt-on clamps 118 but instead via other conventional attachment means such as adhesives (e.g., glue, double-sided tape, or the like) or fasteners such as screws, nuts and bolts, retainer clips, etc.

The design of the hood scoop 100 allows the cables of the light fixture(s) 106 to pass through the first cable access feature, the optional second cable access feature, and the hood aperture (16 or 18) in order to communicate with the vehicle's electrical power and control systems.

Referring to FIGS. 1-4 and 8-11, it is preferred that the protective member 102 is configured and/or shaped to have minimal impact on the aerodynamics of the vehicle.

The above-described components of the hood scoop 100 may be constructed out of any suitable art-disclosed material. Examples of such material are plastic (e.g., acrylonitrile butadiene styrene ("ABS"), polycarbonate, and other polymeric material; metal such as steel including but are not limited to stainless steel, cold rolled steel, mild steel, high strength steel, tempered steel, aluminum, and other metal alloys; fiberglass; and carbon fiber. The thickness of each individual component may vary. Examples of suitable thickness are in the range from about 1/16" to about 1/2" and from about 1 mm to about 6 mm. The exact size and shape of the hood scoop 100 are partially dependent upon the configuration of each of the designated recessed areas (10, 12).

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The present invention further provides a method 200 to install the hood scoop 100 to the designated recessed area (10 or 12) of the hood 14 of a Jeep® Wrangler Rubicon vehicle comprising providing the hood scoop 100 having the protective member 102 and the hood attachment member 104; attaching the hood attachment member 104 to the designated recessed area (10 or 12) using conventional attachment means; and attaching the light fixture(s) 106 to the hood scoop 100 wherein the light fixture(s)' 106 cables pass through the first cable access feature 110, optionally the second cable access feature 112, and the hood aperture (16 or 18) for communication with the vehicle's electrical power and control systems. The method 200 further includes installation of a second hood scoop 100 to the other designated recessed area (10 or 12).

What is claimed is:

1. A method of installing a hood scoop to a designated recessed area of a hood of a vehicle comprising: (a) providing the hood scoop having a protective member and a hood attachment member having a first cable access feature wherein: (i) edge profile of the attachment member matches edge profile of the designated recessed area; and (ii) the designated recessed area includes
   a hood aperture that provides access to the vehicle's electrical power and control systems;
   (b) attaching the hood attachment member to the designated recessed area using conventional attachment means; and
   (c) attaching a light fixture to the hood scoop wherein the light fixture's cables pass through the first cable access feature and the hood aperture for communication with the vehicle's electrical power and control systems.

2. The method of claim 1 wherein the hood scoop further includes a light attachment member having a second cable access feature, the one light fixture is attached to the light attachment member, and the light fixture's cables are also routed through the second cable access feature.

3. The method of claim 1 wherein the light fixture is a LED light bar.

4. The method of claim 1 wherein one or more additional light fixtures are also attached to the hood scoop.

5. The method of claim 1 wherein the conventional attachment means are bolt-on clamps.

6. The method of claim 1 wherein the conventional attachment means are adhesive.

7. The method of claim 1 further comprising:
   (d) providing a second hood scoop having a second protective member and a second hood attachment member having the first cable access feature wherein:
      (i) edge profile of the second attachment member matches edge profile of a second designated recessed area of the hood of the vehicle; and
      (ii) the second designated recessed area includes a second hood aperture that provides access to the vehicle's electrical power and control systems;
   (e) attaching the second attachment member to the second designated recessed area using the conventional attachment means; and
   (f) attaching a second light fixture to the second hood scoop wherein the second light fixture's cables pass through the first cable access feature of the second hood attachment member and the second hood aperture for communication with the vehicle's electrical power and control systems.

8. The method of claim 7 wherein the hood scoop and the second hood scoop each further includes a light attachment member having a second cable access feature, and each of the light fixture and the second light fixture is attached to the light attachment member and the cables pass through the second cable access feature.

9. The method of claim 8 wherein additional LED light fixtures are also attached to each of the hood scoop and the second hood scoop.

10. A method of installing hood scoops onto a hood of a Jeep vehicle comprising:
   (a) providing a hood scoop having a protective member and a hood attachment member having a first cable access feature wherein:
      (i) edge profile of the attachment member matches edge profile of a first designated recessed area of the hood of the Jeep vehicle; and
      (ii) the first designated recessed area includes a hood aperture that provides access to the vehicle's electrical power and control systems;
   (b) attaching the attachment member to the first designated recessed area using conventional attachment means;
   (c) attaching a light fixture to the hood scoop wherein the light fixture's cables pass through the first cable access feature and the hood aperture for communication with the vehicle's electrical power and control systems;
   (d) providing a second hood scoop having a second protective member and a second hood attachment member having the first cable access feature wherein:
      (i) edge profile of the second attachment member matches edge profile of a second designated recessed area of the hood of the Jeep vehicle; and
      (ii) the second designated recessed area includes a second hood aperture that provides access to the vehicle's electrical power and control systems;
   (e) attaching the second attachment member to the second designated recessed area using the conventional attachment means; and
   (f) attaching a second light fixture to the second hood scoop wherein the second light fixture's cables pass through the first cable access feature of the second hood attachment member and the second hood aperture for communication with the vehicle's electrical power and control systems.

11. The method of claim 10 wherein the light fixture and the second light fixture are LED light bars.

12. The method of claim 10 wherein one or more additional light fixtures are also attached to each of the hood scoop and the second hood scoop.

13. A LED hood scoop for attachment to a designated recessed area of a hood of a Jeep vehicle comprising: a protective member, a hood attachment member having a first cable access feature, a light attachment member having a second cable access feature wherein:
   (a) edge profile of the attachment member matches edge profile of the designated recessed area of the hood of the Jeep vehicle;
   (b) the designated recessed area includes a hood aperture that provides access to the vehicle's electrical power and control systems; and
   (c) the LED hood scoop is configured to accept and to house a LED light fixture, the LED light fixture is attached to the LED hood scoop, and cables of the LED light fixture pass through the second cable access feature and the first cable access feature.

14. The LED hood scoop of claim 13 wherein the LED hood scoop is configured to accept and to house multiple LED light fixtures and the LED light fixtures' cables pass through the second cable access feature and the first cable access feature.

15. The LED hood scoop of claim 13 wherein the protective member, the hood attachment member, and the light attachment member are constructed out of mild steel.

16. The LED hood scoop of claim 13 wherein the hood attachment member further includes bolt-on clamps configured for attachment to the hood.

17. A LED hood scoop for attachment to a designated recessed area of a hood of a vehicle comprising: a protective member, a hood attachment member having a first cable access feature, a light attachment member having a second cable access feature wherein:
 (d) edge profile of the attachment member matches edge profile of the designated recessed area;
 (e) the designated recessed area includes a hood aperture that provides access to the vehicle's electrical power and control systems; and
 (f) the LED hood scoop is configured to accept and to house a LED light fixture, the LED light fixture is attached to the LED hood scoop, and cables of the LED light fixture pass through the second cable access feature and the first cable access feature.

18. The LED hood scoop of claim 17 wherein the LED hood scoop is configured to accept and to house multiple LED light fixtures and the LED light fixtures' cables pass through the second cable access feature and the first cable access feature.

19. The LED hood scoop of claim 17 wherein the protective member, the hood attachment member, and the light attachment member are constructed out of mild steel.

20. The LED hood scoop of claim 17 wherein the hood attachment member further includes bolt-on clamps configured for attachment to the hood.

* * * * *